(12) United States Patent
Akhtar et al.

(10) Patent No.: US 12,513,508 B2
(45) Date of Patent: *Dec. 30, 2025

(54) VIRTUAL LINE REGISTRATION SYSTEM

(71) Applicant: T-Mobile USA, Inc., Bellevue, WA (US)

(72) Inventors: Tanveer Akhtar, Bellevue, WA (US); Sabuhi Kiran Zaifuddin, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 381 days.

This patent is subject to a terminal disclaimer.

(21) Appl. No.: 17/985,723

(22) Filed: Nov. 11, 2022

(65) Prior Publication Data
US 2023/0072838 A1   Mar. 9, 2023

Related U.S. Application Data

(63) Continuation of application No. 16/107,592, filed on Aug. 21, 2018, now Pat. No. 11,503,453.

(51) Int. Cl.
*H04W 8/18*  (2009.01)
*H04L 9/40*  (2022.01)
(Continued)

(52) U.S. Cl.
CPC .......... *H04W 8/183* (2013.01); *H04L 63/0807* (2013.01); *H04L 63/0853* (2013.01); *H04L 65/1104* (2022.05); *H04W 60/00* (2013.01)

(58) Field of Classification Search
CPC ..... H04W 8/183; H04W 60/00; H04W 12/35; H04W 12/42; H04W 12/45; H04W 12/72;
(Continued)

(56) References Cited

U.S. PATENT DOCUMENTS 11,503,453 B2 * 11/2022 Akhtar .................. H04W 8/183
2006/0046714 A1   3/2006 Kalavade
(Continued)

FOREIGN PATENT DOCUMENTS

EP   2887717   6/2015
EP   3101864   8/2018
WO  WO 2017/185382  11/2017

OTHER PUBLICATIONS

ETSI, Digital cellular telecommunications system (Phase 2+) (GSM); Universal Mobile Telecommunications System (UMTS); LTE; IP Multimedia Subsystem (IMS); Stage 2 (3GPP TS 23.228 version 15.2.0 Release 15) (Year: 2018).*

(Continued)

*Primary Examiner* — Diane D Mizrahi
*Assistant Examiner* — Jing Gao
(74) *Attorney, Agent, or Firm* — Lee & Hayes, P.C.

(57) ABSTRACT

An improved core network that allows a UE to still initiate and/or receive communications via a native SIM line even if the registration of a virtual line fails is described herein. For example, the UE may include embedded virtual line settings that, when enabled, cause the UE to transmit a virtual line registration request to the core network. The core network can determine whether the UE is authorized to register a virtual line. If the UE is authorized, the core network can register a native SIM line, register the virtual line, and transmit a single message to the UE indicating that the native SIM and virtual lines are registered. If the UE is not authorized, the core network still registers the native SIM line and transmits a single message to the UE indicating that the native SIM line is registered.

20 Claims, 6 Drawing Sheets

(51) Int. Cl.
*H04L 65/1104* (2022.01)
*H04W 60/00* (2009.01)

(58) Field of Classification Search
CPC .................. H04W 4/24; H04W 12/06; H04W 36/0016; H04W 80/10; H04W 84/04; H04W 84/042; H04W 88/16; H04W 8/04; H04W 8/08; H04W 8/12; H04W 92/02; H04W 92/12; H04L 63/0807; H04L 63/0853; H04L 65/1104; H04L 65/1045; H04L 65/1095; H04L 65/1016; H04L 65/1046; H04L 65/1073; H04L 29/12094; H04L 61/1529; H04L 65/1066; H04L 67/16; H04L 29/06; H04L 29/12188; H04L 61/1588; H04L 63/08; H04L 65/1063; H04L 65/1006; H04M 1/274566; H04M 2203/1008; H04M 2250/60

See application file for complete search history.

(56) References Cited

U.S. PATENT DOCUMENTS

| | | | |
|---|---|---|---|
| 2013/0203408 A1 | 8/2013 | Dowds et al. | |
| 2014/0282990 A1* | 9/2014 | Engelhart | H04L 67/02 726/9 |
| 2015/0304846 A1 | 10/2015 | Wallis | |
| 2017/0150472 A1 | 5/2017 | Zhang | |
| 2017/0325134 A1 | 11/2017 | Wan et al. | |
| 2018/0077152 A1 | 3/2018 | Lipovkov | |
| 2019/0069172 A1* | 2/2019 | Li | H04W 12/06 |

OTHER PUBLICATIONS

ETIS, Digital Cellular Telecommunications System (Phase 2+) (GSM); Universal Mobile Telecommunications System (UMTS); LTE; IP Multimedia Subsystem (IMS); Stage 2 (3GPP TS 23.228 Version 15.2.0 Release 15) (Year: 2018).*

ETSI, Digital cellular telecommunications system (Phase 2+) (GSM); Universal Mobile Telecommunications System (UMTS); LTE; IP Multimedia Subsystem (IMS); Stage 2 (3GPP TS 23.228 version 15.2.0 Release 15), ETSI Technical Specification, Jul. 2018.

ETSI, Digital cellular telecommunications systems (Phase 2+) (GSM); Universal Mobile Telecommunications Systems (UMTS); LTE; TG; IP multimedia call control protocol based on Session Initiation Protocol (SIP) and Session Description Protocol (SDP); Stage 3 (3GPP TS 24.229 version 15.3.0 Release 15), ETSI Technical Specification, Jun. 2018.

International Search Report and Written Opinion for International Application No. PCT/US2019/047193, Notification mailed Oct. 10, 2019.

* cited by examiner

VIRTUAL LINE REGISTRATION SYSTEM

CROSS-REFERENCE TO RELATED APPLICATIONS

This application is a continuation of U.S. patent application Ser. No. 16/107,592, entitled "IMPROVED VIRTUAL LINE REGISTRATION SYSTEM" and filed on Aug. 21, 2018, which is hereby incorporated by reference herein in its entirety.

BACKGROUND

A core network (also known as network core or backbone network) is the central part of a telecommunications network that provides various services to telecommunication devices, often referred to as user equipment ("UE"), that are connected by access network(s) of the telecommunications network. Typically, a UE registers with the core network before the various services provided by the core network are accessible to the UE. For example, the UE can provide various information to the core network, such as subscriber identity module (SIM) information, and the core network can use this information to authenticate the UE and register the UE with the core network.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

As described above, a UE typically registers with the core network before the various services provided by the core network are accessible to the UE. For example, registration with the core network may allow a user operating a UE to make telephone calls using a native SIM line (e.g., the telephone number associated with the user's network provider account, which may be included in the data stored in the SIM card of the UE).

In some instances, the UE may include embedded virtual line settings that, when enabled, allow the UE to make and receive telephone calls (and/or send and receive text messages) using a virtual line. A virtual line may not be identified in the data stored in the SIM card of the UE (e.g., the virtual line may not necessarily be associated with a specific UE or SIM card). Rather, the virtual line may be associated with the user operating the UE. A user can choose to associate the same virtual line with one or more UEs. If a call is made to a virtual line, each UE that is associated with the virtual line may ring or otherwise notify the user that a call has been received. The enabling of the virtual line settings does not interfere with communications by the UE via the native SIM line, and thus the same UE can initiate and/or receive communications on the native SIM line and on the virtual line (or multiple virtual lines).

Accordingly, a virtual line allows a user (1) to use a single UE for initiating and/or receiving communications over multiple lines and (2) to use multiple UEs for initiating and/or receiving communications over the same line. In fact, because the virtual line is separate from the native SIM line, virtual line settings can be embedded on any compatible network-enabled device (e.g., tables, laptops, smart watches, appliances, digital assistants, etc.)—not just traditional handsets or smart phones that include a SIM—to allow a user to initiate and/or receive communications over a virtual line via such a device.

Like the native SIM line, the virtual line is authenticated and registered with the core network so that a UE can access services provided by the core network when using the virtual line. The registration may be initiated by a UE that includes the embedded virtual line settings, where the UE can communicate with the core network via one or more access networks. In some cases, issues may occur when the UE attempts a combined register of a SIM and a virtual line with the core network.

For example, after the UE transmits a combined SIM and virtual line registration request, the core network may attempt to register the virtual line along with the SIM line. If the registration is successful, the UE is notified and the user can use both the native SIM line and the registered virtual line. However, if the registration of the virtual line is not successful, features of the UE and/or the core network cause not only a failure of the virtual line registration, but also a failure of the native SIM line registration, thus causing failure of the native SIM line to initiate and/or receive communications via the core network. In particular, the UE can no longer use the native SIM line to initiate and/or receive communications via the core network, even if the native SIM line had been previously registered with the core network. In some instances, emergency call functionality of the UE is also disabled, which can be problematic if the user of the UE finds herself or himself in an emergency situation.

Accordingly, described herein is an improved core network that allows a UE to still initiate and/or receive communications via a native SIM line even if the registration of a virtual line submitted by a UE that includes embedded virtual line settings fails. For example, the core network may include a proxy-call session control function (P-CSCF), an authentication and authorizing gateway (AAG), an identity and access management (IAM), a home subscriber server (HSS), one or more interrogating call session control functions (I-CSCFs), and/or one or more serving call session control functions (S-CSCFs). The UE may communicate with the P-CSCF via an access network. In particular, in response to a user attempting to register a virtual line on the UE after enabling the embedded virtual line settings, the UE can transmit a virtual line registration request to the P-CSCF. If a native SIM line associated with the SIM card of the UE has already been registered, then the P-CSCF may instruct an I-CSCF and/or S-CSCF to deregister the native SIM line. The P-CSCF will then send a native SIM line initial registration request to an I-CSCF. The I-CSCF can query the HSS to identify the appropriate S-CSCF to handle registration of the native SIM line and, once the appropriate S-CSCF is identified, transmit an instruction to the identified S-CSCF to initiate a native SIM line registration. The S-CSCF can initiate the native SIM line registration by transmitting an authentication request to the UE via the P-CSCF. As an illustrative example, the authentication request may be a session initiation protocol (SIP) 401 authentication challenge. The UE can provide a response (e.g., a password, a one-time passcode, a token, a cookie, etc.) and the S-CSCF can use the response to determine whether the UE is authenticated. If the S-CSCF determines that authentication is successful, then the S-CSCF transmits a message to the P-CSCF indicating that the native SIM line has been successfully registered. As an illustrative example, the message indicating that the native SIM line has been successfully registered may be a SIP 200OK message.

Once the P-CSCF receives an indication that the native SIM line has been successfully registered, then the P-CSCF queries the AAG to determine whether a Service-Authorization token (SAT) included in the virtual line registration request is valid. If the AAG returns an indication that the SAT is valid, then the P-CSCF can query the IAM to determine whether the UE and/or user operating the UE has the appropriate permissions to register and use a virtual line via the core network. If the IAM indicates that the UE and/or user operating the UE has the appropriate permissions, then the P-CSCF can send a virtual line registration request to an I-CSCF, and the I-CSCF, HSS, and/or S-CSCF can perform similar operations as discussed above with respect to the native SIM line. Furthermore, on receiving registration response from the S-CSCF, the P-CSCF can send a single message to the UE, indicating that both the native SIM line and the virtual line have been registered. The UE then considers both lines to be registered and both lines can use the core network to initiate and/or receive communications.

However, if either the AAG returns an indication that the SAT is not valid or the IAM indicates that the UE and/or user operating the UE does not have the appropriate permissions, then the P-CSCF does not send a virtual line registration request to an I-CSCF. Rather, the P-CSCF sends a single message to the UE, indicating that the native SIM line has been registered. The UE will then not show that the virtual line has been registered, but the UE can still continue to use the native SIM line via the core network and/or emergency call functionality will still be available.

In other embodiments, the P-CSCF queries the AAG and/or IAM prior to sending the native SIM line registration request to the I-CSCF. Even if the AAG returns an indication that the SAT is not valid or the IAM indicates that the UE and/or the user operating the UE does not have the appropriate permissions, the P-CSCF can still send the native SIM line registration request to an I-CSCF. Once the S-CSCF indicates to the P-CSCF that the native SIM line has been successfully registered, then the P-CSCF can send a single message to the UE, indicating that the native SIM line has been registered. The UE will then not show that the virtual line has been registered, but the UE can still continue to use the native SIM line via the core network and/or emergency call functionality will still be available.

While the present disclosure is described with reference to UEs that include embedded virtual line settings, this is not meant to be limiting. For example, a UE may include a native virtual line application (e.g., an application offered by the operator of the core network) or a third party virtual line application (e.g., an application created and/or offered by an entity other than the operator of the core network). The techniques described herein can also be implemented for UEs that include the native virtual line application or the third party virtual line application rather than embedded virtual line settings, where the registration of virtual lines may be performed through the native or third party virtual line application (e.g., where the native or third party virtual line application can communicate with the core network via an access network to allow a user to initiate and/or receive communications using a virtual line).

The foregoing aspects and many of the attendant advantages of this disclosure will become more readily appreciated as the same become better understood by reference to the following detailed description, when taken in conjunction with the accompanying drawings.

Example Virtual Line Registration Environment

Figure 1:
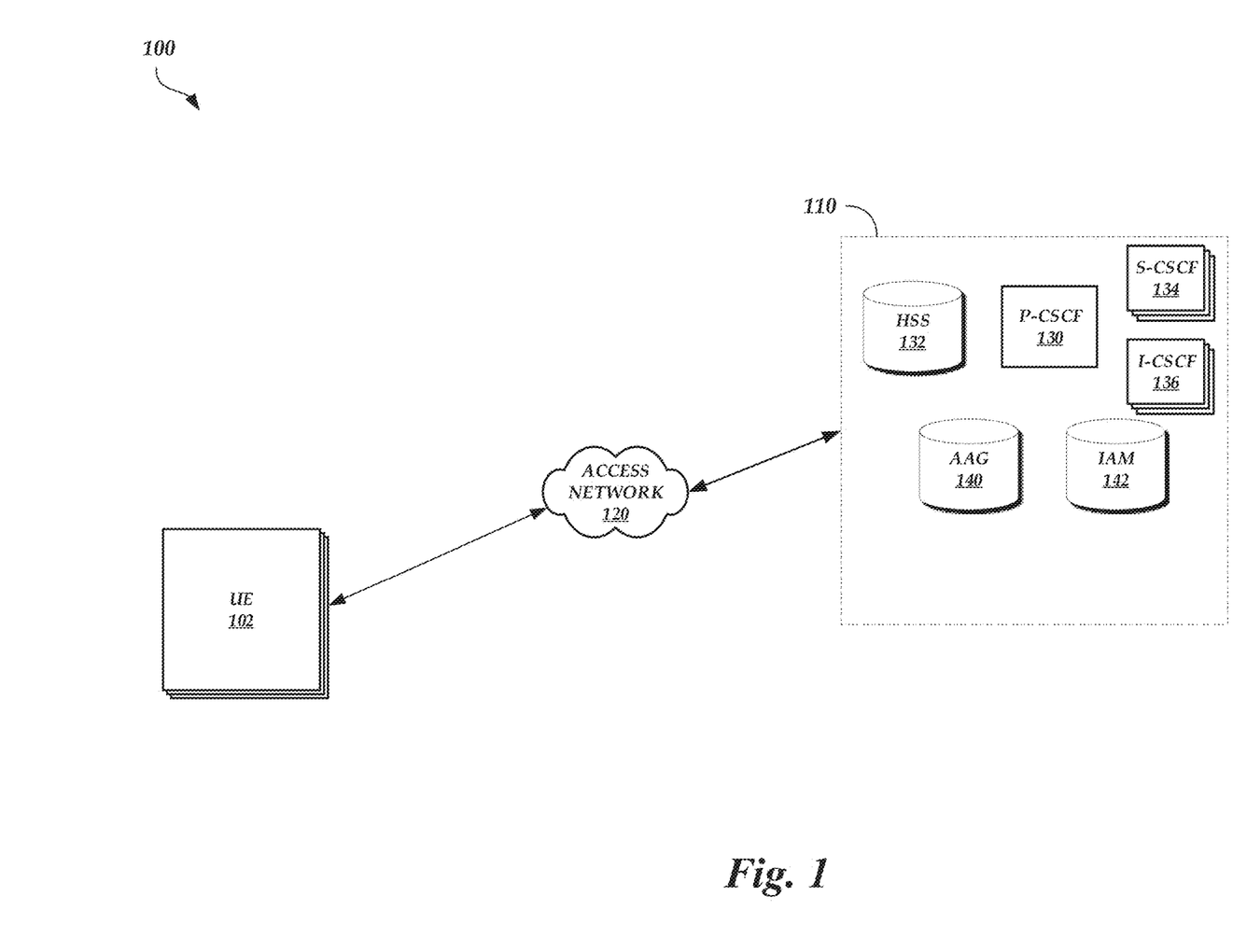
FIG. 1 is a block diagram of an illustrative native SIM and virtual line registration environment in which a P-CSCF initiates native SIM and virtual line registrations in a core network.

FIG. 1 is a block diagram of an illustrative native SIM and virtual line registration environment 100 in which a P-CSCF 130 may initiate native SIM and virtual line registrations in a core network 110. The environment 100 includes one or more UEs 102 that communicate with the core network 110 via an access network 120. The core network 110 includes the P-CSCF 130, an HSS 132, one or more S-CSCFs 134, one or more I-CSCFs 136, an AAG 140, and an IAM 142. The core network 110 may further include other components, not shown, such as a session border controller (SBC), a breakout gateway control function (BGCF), a media gateway controller function (MGCF), etc.

The UE 102 can be any computing device, such as a desktop, laptop or tablet computer, personal computer, wearable computer, server, personal digital assistant (PDA), hybrid PDA/mobile phone, electronic book reader, appliance (e.g., refrigerator, washing machine, dryer, dishwasher, etc.), integrated component for inclusion in computing devices, home electronics (e.g., television, set-top box, receiver, etc.), vehicle, machinery, landline telephone, network-based telephone (e.g., voice over Internet protocol ("VoIP")), cordless telephone, cellular telephone, smart phone, modem, gaming device, media device, control system (e.g., thermostat, light fixture, etc.), and/or any other type of Internet of Things (IoT) device or equipment. In an illustrative embodiment, the UE 102 includes a wide variety of software and hardware components for establishing communications over one or more communication networks, including the access network 120, the core network 110, and/or other private or public networks. For example, the UE 102 may include a subscriber identification module (SIM) card (e.g., an integrated circuit that stores data to identify and authenticate a UE that communicates over a telecommunications network) and/or other component(s) that enable the UE 102 to communicate over the access network 120, the core network 110, and/or other private or public networks via a radio area network (RAN) and/or a wireless local area network (WLAN). The SIM card may be assigned to a particular user account.

The UEs 102 are communicatively connected to the core network 110 via the access network 120, such as GSM EDGE Radio Access Network (GRAN), GSM EDGE Radio Access Network (GERAN), Universal Terrestrial Radio Access Network (UTRAN), Evolved Universal Terrestrial Radio Access (E-UTRAN), and/or the like. Illustratively, the access network 120 is distributed over land areas called cells, each served by at least one fixed-location transceiver, known as a cell site or base station. The base station provides the cell with the network coverage which can be used for transmission of voice, messages, or other data. A cell might use a different set of frequencies from neighboring cells, to avoid interference and provide guaranteed service quality within each cell. When joined together these cells provide radio coverage over a wide geographic area. This enables a large number of UEs 102 to communicate via the fixed-location transceivers. Although the access network 120 is illustrated as a single network, one skilled in the relevant art will appreciate that the access network can include any number of public or private communication networks and/or network connections.

The core network 110 provides various services to UEs 102 that are connected via the access network 120. One of the main functions of the core network 110 is to route telephone calls, messages, and/or other data across a public switched telephone network (PSTN) or Internet protocol (IP) Multimedia Subsystem (IMS). For example, the core network 110 may include a call routing system, which routes telephone calls, messages, and/or other data across a PSTN or IMS. The core network 110 may provide high capacity communication facilities that connect various nodes implemented on one or more computing devices, allowing the nodes to exchange information via various paths.

The UE 102 may communicate with the P-CSCF 130 via the access network 120. The P-CSCF 130 may control data transmissions involved in creating, implementing, and/or terminating telephone calls, data communications, and/or other communications. The P-CSCF 130 may also handle native SIM and/or virtual line registration requests, serving as an interface between the UE 102 and the other components in the core network 110. For example, in response to a user attempting to register a virtual line on the UE 102, the UE 102 can transmit a virtual line registration request to the P-CSCF 130. The UE 102 can also initiate a deregistration of the native SIM line (if the native SIM line has already been registered), which causes the P-CSCF 130 and/or other components in the core network 110 to deregister the native SIM line. The UE 102 may initiate the native SIM line deregistration prior to or after submitting the virtual line registration request to the P-CSCF 130.

The virtual line registration request may include a private P-preferred-association (PPA) header, a request uniform resource identifier (R-URI), information identifying the native SIM line of the UE 102 (e.g., the native SIM line phone number, SIM card date, etc.), information identifying the virtual line to register (e.g., the virtual line phone number), and/or an international mobile subscriber identity (IMSI) (e.g., information used to identify the user of the UE 102). The private PPA header may further include a SAT. The P-CSCF 130 can optionally modify the virtual line registration request received from the UE 102 (e.g., change the R-URI from an address initially selected by the UE 102 to an address used by the core network 110 for virtual line registrations).

The P-CSCF 130 can interface with various components in the core network 110 to validate the SAT, determine whether the UE 102 and/or the user operating the UE 102 has the appropriate permissions to register a virtual line, and to initiate native SIM and/or virtual line registrations. The P-CSCF 130 can use the SIP to send and receive messages within the core network 110.

For example, in response to receiving the combined SIM and virtual line registration request from the UE 102, the P-CSCF 130 can send a native SIM line registration request to an I-CSCF 136. The native SIM line registration request may include some or all of the information present in the virtual line registration request (e.g., all information except the information identifying the virtual line to register). The I-CSCF 136 can identify an S-CSCF 134 to perform a native SIM and/or virtual line registration, hide an internal portion of the core network 110 from the public, and/or perform other functionality. Here, upon receiving the native SIM line registration request, the I-CSCF 136 can query the HSS 132 to identify an address of an S-CSCF 134 to handle the native SIM line registration. The HSS 132 may generally store subscription-related data, such as subscriber profiles, subscriber location, subscriber Internet protocol (IP) information, and/or the like, S-CSCF 134 addresses, etc. Once an address of an S-CSCF 134 is provided to the I-CSCF 136 by the HSS 132, the I-CSCF 136 can instruct that S-CSCF 134 corresponding to the address to initiate a native SIM line registration.

A S-CSCF 134 can communicate with the HSS 132 to obtain subscriber profiles, handle native SIM and/or virtual line registrations, communicate with UEs 102 via the P-CSCF 130 as part of the line registration process, can provide data routing services, etc. Here, in response to receiving the instruction from the I-CSCF 136 to initiate the native SIM line registration process, the S-CSCF 134 can transmit an authentication request to the UE 102 via the P-CSCF 130. As an illustrative example, the authentication request may be a SIP 401 authentication challenge (or a 401 unauthorized). The authentication request may prompt a user operating the UE 102 to provide an authentication factor (e.g., a password, a security answer, a one-time passcode, a token, a cookie, a certificate, a fingerprint, an iris scan, a passcode, etc.). Once the user provides a response to the prompt, the UE 102 can forward the response to the S-CSCF 134 via the P-CSCF 130. The S-CSCF 134 can then use the response to authenticate or not authenticate the UE 102 and/or the user operating the UE 102 (e.g., authentication is successful if the response matches an expected response and authentication is not successful if the response does not match an expected response, etc.).

If the authentication is successful, the S-CSCF 134 can register the native SIM line and notify the P-CSCF 130 that registration of the native SIM line was successful. For example, the notification may be an SIP 200OK that indicates that the native SIM line registration was successful. The P-CSCF 130 may hold the notification, not forwarding the notification to any other component in the core network 110 or to the UE 102 until the virtual line registration can be initiated. For example, after receiving the notification, the P-CSCF 130 can query the AAG 140 to determine whether the SAT included in the private PPA header of the virtual line registration request is valid. The AAG 140 then returns a message to the P-CSCF 130 indicating whether the SAT is valid or invalid. For example, the message may be a SIP 200OK if the SAT is valid. The message may include an indication of when the SAT expires, IMSI data, the SAT itself, etc.

If the AAG 140 returns an indication that the SAT is valid (where the indication may include an international mobile subscriber identity (IMSI) of the virtual line), then the P-CSCF 130 can query the IAM 142 to determine whether the UE 102 and/or user operating the UE 102 has the appropriate permissions to register and use a virtual line via the core network 110 (e.g., by including an identifier associated with the UE 102 and/or the user in the query). The IAM 142 then returns a message to the P-CSCF 130 indicating whether the UE 102 and/or the user operating the UE 102 has the appropriate permissions to register and use a virtual line via the core network 110. For example, the message may be a SIP 200OK if the UE 102 and/or the user operating the UE 102 has the appropriate permissions. The message may include a user identification, the permissions of the UE 102 and/or user, IMSI data, etc.

If the IAM 142 indicates that the UE 102 and/or user operating the UE 102 has the appropriate permissions (and the AAG 140 indicated that the SAT is valid), then the P-CSCF 130 determines that the virtual line can be registered. Thus, the P-CSCF 130 can send a virtual line registration request to an I-CSCF 136, and the I-CSCF 136, HSS 132, and/or S-CSCF 134 can perform similar operations as discussed above with respect to the native SIM line registration in order to register the virtual line. The virtual line registration request sent to the I-CSCF 136 can include some or all of the information included in the virtual line registration request received from the UE 102. Furthermore, after receiving the virtual line registration response from the I-CSCF 136, the P-CSCF 130 can send a single message to the UE 102, indicating that both the native SIM line and the virtual line have been registered. For example, the single message may be a single SIP 200OK message. The single message may reference both SIM and virtual lines in a SIP P-Associated-URI header.

Once the single message is received with the SIM and virtual lines referenced in the P-Associated-URI header, the UE 102 considers both lines to be registered and both lines can use the core network 110 to initiate and/or receive communications. In examples in which the UE 102 includes a native and/or third party virtual line application, the native application running on the UE 102 can be used to initiate and/or receive communications via the native SIM line and the third party virtual line application can be used to initiate and/or receive communications via the virtual line.

However, if either the AAG 140 returns an indication that the SAT is not valid or the IAM 142 indicates that the UE 102 and/or user operating the UE 102 does not have the appropriate permissions, then the P-CSCF 130 does not send a virtual line registration request to an I-CSCF 136. Rather, the P-CSCF 130 sends a single message to the UE 102 with the P-Associated-URI only including a reference to the SIM line, indicating that the native SIM line has been registered. For example, the single message may be a single SIP 200OK message. The UE 102 will then not display or otherwise indicate that the virtual line has been registered, but the UE 102 can still continue to use the native SIM line over the core network 110 (because the native SIM line is still registered with the core network 110) and/or emergency call functionality will still be available on the UE 102.

In other embodiments, the P-CSCF 130 queries the AAG 140 and/or IAM 142 prior to sending the native SIM line registration request to the I-CSCF 136. Even if the AAG 140 returns an indication that the SAT is not valid or the IAM 142 indicates that the UE 102 and/or the user operating the UE 102 does not have the appropriate permissions, the P-CSCF 130 still sends the native SIM line registration request to an I-CSCF 136. Once the S-CSCF 134 indicates to the P-CSCF 130 that the native SIM line has been successfully registered, then the P-CSCF 130 can send a single message (e.g., an SIP 200OK message) to the UE 102 indicating that the native SIM line has been registered. The UE 102 will then not display or otherwise indicate that the virtual line has been registered, but the UE 102 can still continue to use the native SIM line over the core network 110 (because the native SIM line is still registered with the core network 110) and/or emergency call functionality will still be available on the UE 102.

Some or all of the operations described above can be repeated each time a user attempts to add a new virtual line to the UE 102 and register the new virtual line with the core network 110. However, if a first virtual line has already been registered with the core network 110 and associated with the UE 102, then the UE 102 may not trigger the deregistering of the native SIM line. Rather, the UE 102 may transmit a refresh registration request, which includes some or all of the information included in the virtual line registration request discussed above, and which causes the components of the core network 110 to perform the operations directed to registering the new virtual line (e.g., querying the AAG 140, querying the IAM 142, sending a virtual line registration request to the I-CSCF 136, etc.) and not perform operations directed to registering the native SIM line (since the native SIM line is already registered).

Each of the components in the core network 110, such as the P-CSCF 130, the HSS 132, the S-CSCFs 134, the I-CSCFs 136, the AAG 140, and/or the IAM 142, may be a single computing device or may include multiple distinct computing devices, such as computer servers, logically or physically grouped together to collectively operate as a server system. Each of the components in the core network 110 can each be implemented in application-specific hardware (e.g., a server computing device with one or more ASICs, one or more processors, memory, a network interface, a bus, input/output devices, etc.) such that no software is necessary, or as a combination of hardware and software. In addition, the modules and components of the core network 110 can be combined on one server computing device or separated individually or into groups on several server computing devices. In some embodiments, the core network 110 may include additional or fewer components than illustrated in FIG. 1.

Example Block Diagram for Registering a Virtual Line

Figure 2:
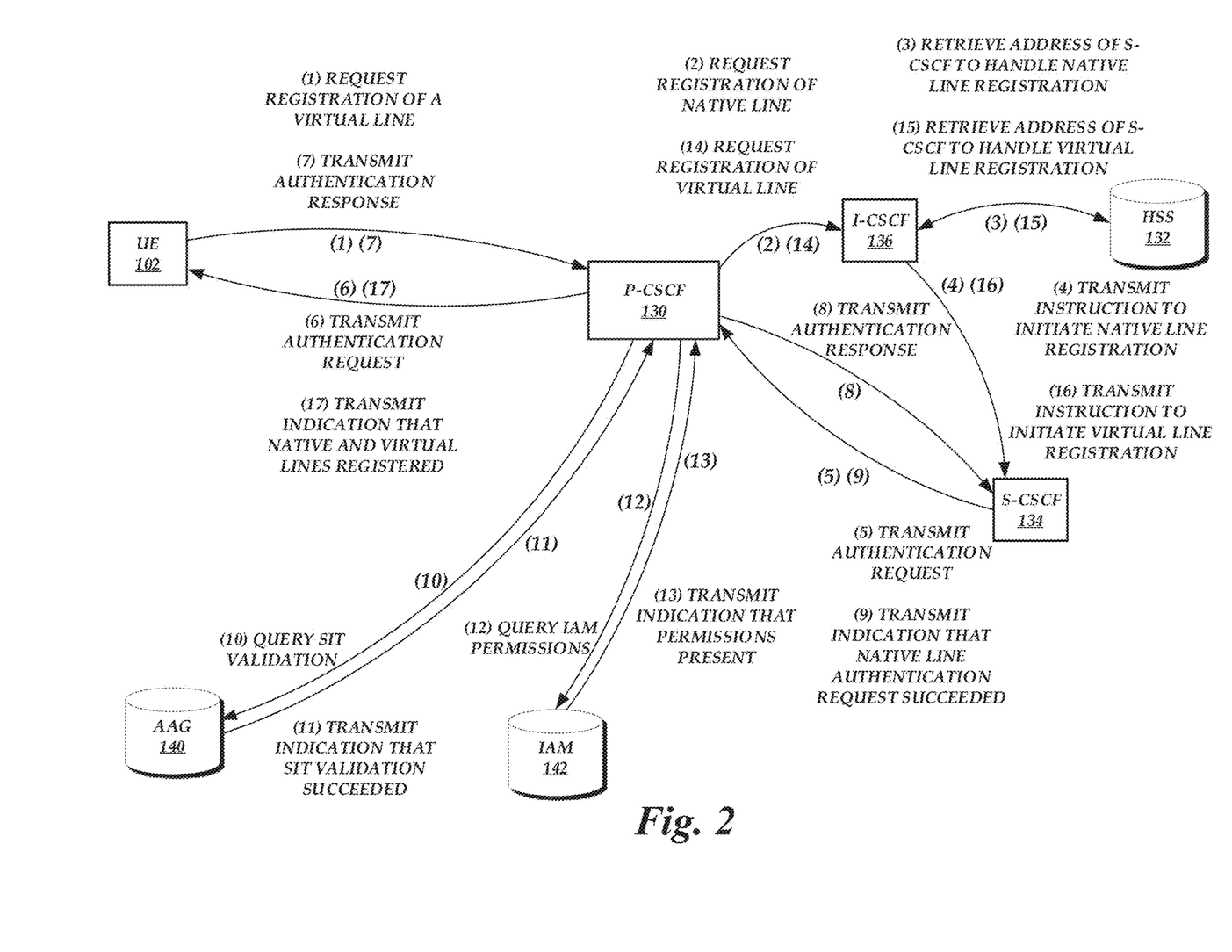
FIG. 2 is a block diagram of the native SIM and virtual line registration environment of FIG. 1 illustrating the operations performed by the components of the native SIM and virtual line registration environment to register a native SIM and virtual line, according to one embodiment.

FIG. 2 is a block diagram of the native SIM and virtual line registration environment 100 of FIG. 1 illustrating the operations performed by the components of the native SIM and virtual line registration environment 100 to register a virtual line, according to one embodiment. As illustrated in FIG. 2, a UE 102 requests the registration of a virtual line at (1) and transmits the request to the P-CSCF 130. The request may be submitted before, during, or after requesting the deregistration of the native SIM line. Alternatively, the P-CSCF 130 will automatically trigger the deregistration of the native SIM line without any request from the UE 102.

The request may include a SAT. The P-CSCF 130 can request the registration of the native SIM line at (2) and transmit the request to the I-CSCF 136. The P-CSCF 130 may request the registration of the native SIM line because the native SIM line was deregistered in response to the UE 102 requesting the registration of the virtual line.

The I-CSCF 136 can retrieve an address of an S-CSCF 134 to handle the native SIM line registration from the HSS 132 at (3), and then transmit an instruction to the S-CSCF 134 corresponding to the retrieved address to initiate the native SIM line registration at (4).

In response, the S-CSCF 134 can transmit an authentication request to the P-CSCF 130 at (5), which is then relayed by the P-CSCF 130 to the UE 102 at (6). For example, the authentication request may be a SIP 401 authentication challenge.

Reception of the authentication request may cause the UE 102 to prompt the user to provide an authentication response. Such a response can include a password, a security answer, a one-time passcode, a token, a cookie, a certificate, a fingerprint, an iris scan, a passcode, etc. Once the user provides the authentication response, the UE 102 transmits the authentication response to the P-CSCF 130 at (7), which then forwards the authentication response to the S-CSCF 134 at (8) (directly or via the I-CSCF 136). The S-CSCF 134 can evaluate the authentication response and, if the response matches or closely matches an expected response, can transmit an indication to the P-CSCF 130 that the native SIM line authentication request succeeded at (9) and thus the native SIM line is or will be registered with the core network 110. However, if the authentication fails (e.g., the response does not match the expected response), then the native SIM line registration also fails.

In response to receiving the indication that the native SIM line authentication request succeeded, the P-CSCF 130 queries the AAG 140 at (10) to determine if the SAT included in the virtual line registration request received from the UE 102 is valid. Here, the AAG 140 validates the SAT and transmits an indication to the P-CSCF 130 that the SAT validation succeeded at (11).

Before, during, or after querying the AAG 140 (and in response to receiving the indication that the native SIM line authentication request succeeded), the P-CSCF 130 queries the IAM 142 at (12) to determine whether the UE 102 and/or the user operating the UE 102 is associated with permissions that allow the UE 102 and/or user to use a virtual line in the core network 110. Here, the IAM 142 determines that the UE 102 and/or user has the right permissions and transmits an indication to the P-CSCF 130 that the right permissions are present and associated with the UE 102 and/or user at (13).

In response to receiving the SAT validation message from the AAG 140 and the permissions present message from the IAM 142, the P-CSCF 130 determines that the virtual line can be registered. Thus, the P-CSCF 130 requests registration of the virtual line at (14), transmitting the request to an I-CSCF 136 (which can be the same or different I-CSCF 136 as the I-CSCF 136 that initiated the native SIM line registration). The I-CSCF 136 can retrieve an address of an S-CSCF 134 to handle the virtual line registration from the HSS 132 at (15), and then transmit an instruction to the S-CSCF 134 corresponding to the retrieved address to initiate the virtual line registration at (16) (where the S-SCSF 134 can be the same or different S-CSCF 134 as the S-CSCF 134 that initiated the virtual line registration).

Before, during, or after requesting registration of the virtual line, the P-CSCF 130 can generate a single message and transmit the single message to the UE 102 indicating that the native SIM and virtual lines are registered at (17). In response, the UE 102 may display or otherwise indicate that the virtual line is registered and ready for use. In addition, the native SIM line and/or emergency call functionality may still be operational on the UE 102.

Figure 3:
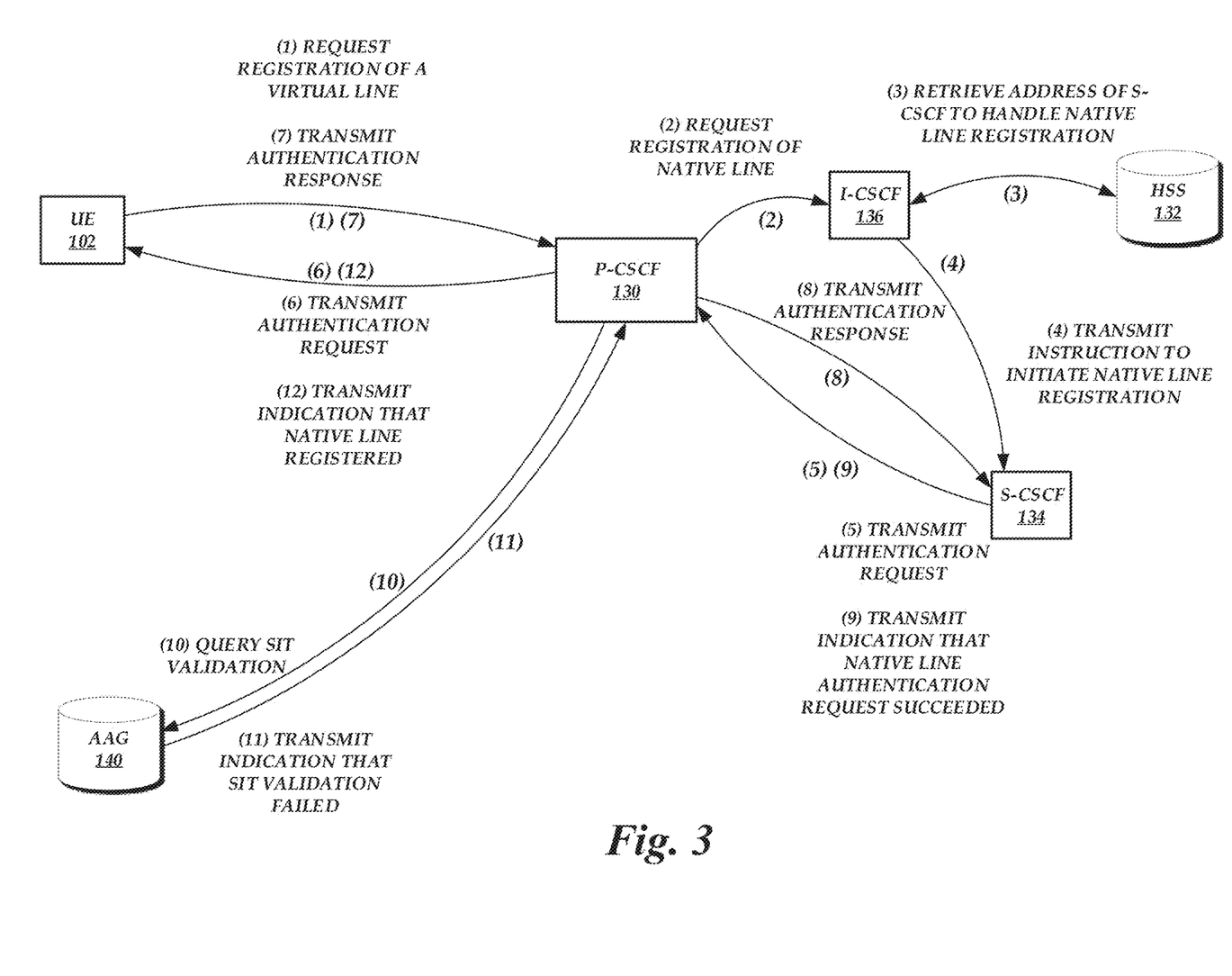
FIG. 3 is a block diagram of the native SIM and virtual line registration environment of FIG. 1 illustrating the operations performed by the components of the native SIM and virtual line registration environment when the Service-Authorization-Token (SAT) validation fails, according to one embodiment.

In some embodiments, however, the SAT validation and/or the permissions query may fail. FIG. 3 is a block diagram of the native SIM and virtual line registration environment 100 of FIG. 1 illustrating the operations performed by the components of the native SIM and virtual line registration environment 100 when the SAT validation fails, according to one embodiment. As illustrated in FIG. 3, a UE 102 requests the registration of a virtual line at (1) and transmits the request to the P-CSCF 130. The request may be submitted before, during, or after requesting the deregistration of the native SIM line. Alternatively, the P-CSCF 130 will automatically trigger the deregistration of the native SIM line without any request from the UE 102.

The request may include a SAT. The P-CSCF 130 can request the registration of the native SIM line at (2) and transmit the request to the I-CSCF 136. The P-CSCF 130 may request the registration of the native SIM line because the native SIM line was deregistered in response to the UE 102 requesting the registration of the virtual line.

The I-CSCF 136 can retrieve an address of an S-CSCF 134 to handle the native SIM line registration from the HSS 132 at (3), and then transmit an instruction to the S-CSCF 134 corresponding to the retrieved address to initiate the native SIM line registration at (4).

In response, the S-CSCF 134 can transmit an authentication request to the P-CSCF 130 at (5), which is then relayed by the P-CSCF 130 to the UE 102 at (6). For example, the authentication request may be a SIP 401 authentication challenge.

Reception of the authentication request may cause the UE 102 to prompt the user to provide an authentication response. Such a response can include a password, a security answer, a one-time passcode, a token, a cookie, a certificate, a fingerprint, an iris scan, a passcode, etc. Once the user provides the authentication response, the UE 102 transmits the authentication response to the P-CSCF 130 at (7), which then forwards the authentication response to the S-CSCF 134 at (8) (directly or via the I-CSCF 136). The S-CSCF 134 can evaluate the authentication response and, if the response matches or closely matches an expected response, can transmit an indication to the P-CSCF 130 that the native SIM line authentication request succeeded at (9) and thus the native SIM line is or will be registered with the core network 110. However, if the authentication fails (e.g., the response does not match the expected response), then the native SIM line registration also fails.

In response to receiving the indication that the native SIM line authentication request succeeded, the P-CSCF 130 queries the AAG 140 at (10) to determine if the SAT included in the virtual line registration request received from the UE 102 is valid. Here, the AAG 140 cannot validate the SAT and transmits an indication to the P-CSCF 130 that the SAT validation failed at (11).

Because the SAT validation failed, the P-CSCF 130 may not query the IAM 142 or request registration of the virtual line. Rather, the P-CSCF 130 can generate a single message and transmit the single message to the UE 102 at (12). In response, the UE 102 may display or otherwise indicate that the virtual line is not registered and/or that registration failed. However, the native SIM line and/or emergency call functionality may still be operational on the UE 102 given that the native SIM line has been registered.

Figure 4:
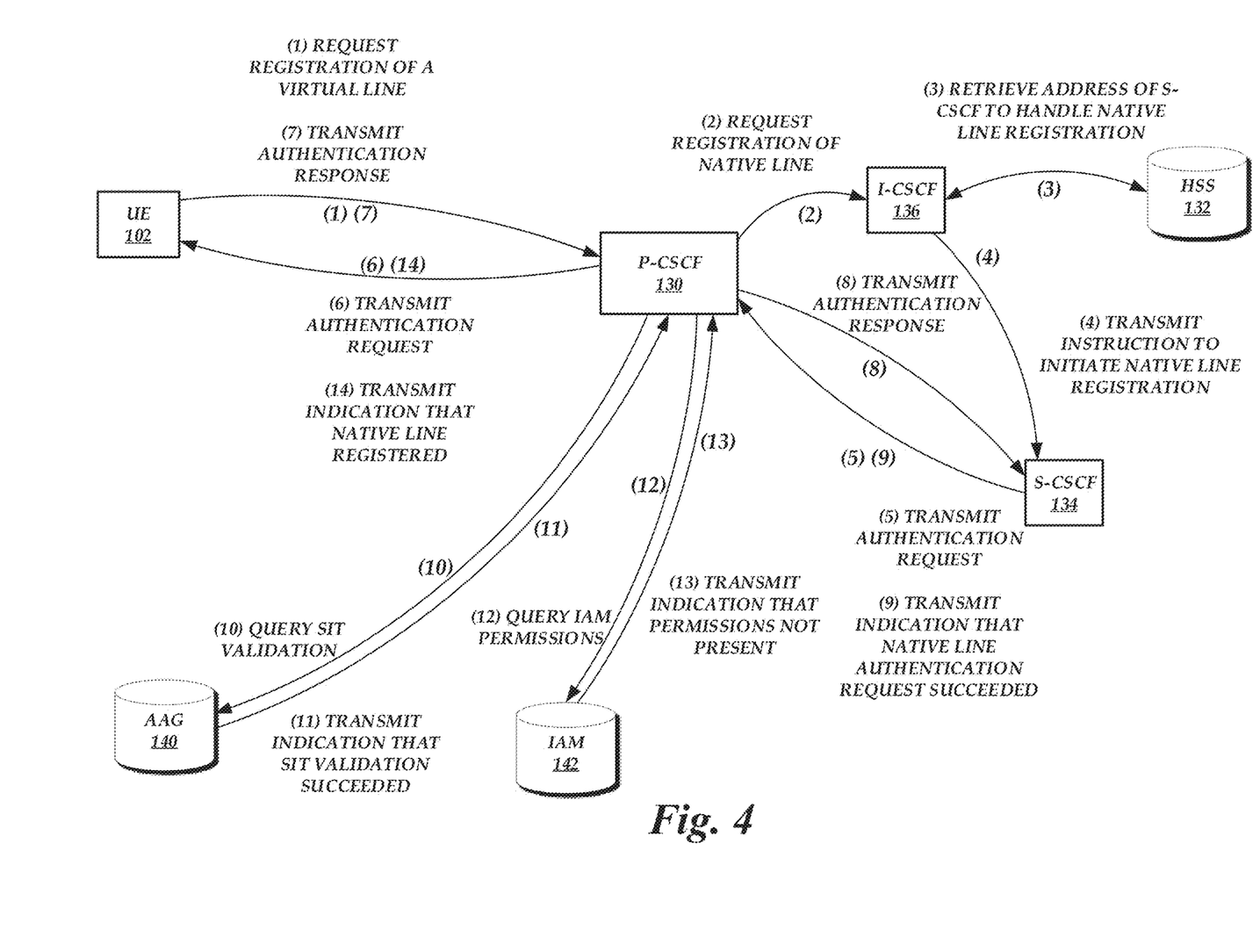
FIG. 4 is a block diagram of the native SIM and virtual line registration environment of FIG. 1 illustrating the operations performed by the components of the native SIM and virtual line registration environment when a permissions query fails, according to one embodiment.

FIG. 4 is a block diagram of the native SIM and virtual line registration environment 100 of FIG. 1 illustrating the operations performed by the components of the native SIM and virtual line registration environment 100 when a permissions query fails, according to one embodiment. As illustrated in FIG. 4, a UE 102 requests the registration of a virtual line at (1) and transmits the request to the P-CSCF 130. The request may be submitted before, during, or after requesting the deregistration of the native SIM line. Alternatively, the P-CSCF 130 will automatically trigger the deregistration of the native SIM line without any request from the UE 102.

The request may include a SAT. The P-CSCF 130 can request the registration of the native SIM line at (2) and transmit the request to the I-CSCF 136. The P-CSCF 130 may request the registration of the native SIM line because the native SIM line was deregistered in response to the UE 102 requesting the registration of the virtual line.

The I-CSCF 136 can retrieve an address of an S-CSCF 134 to handle the native SIM line registration from the HSS 132 at (3), and then transmit an instruction to the S-CSCF 134 corresponding to the retrieved address to initiate the native SIM line registration at (4).

In response, the S-CSCF 134 can transmit an authentication request to the P-CSCF 130 at (5), which is then relayed by the P-CSCF 130 to the UE 102 at (6). For example, the authentication request may be a SIP 401 authentication challenge.

Reception of the authentication request may cause the UE 102 to prompt the user to provide an authentication response. Such a response can include a password, a security answer, a one-time passcode, a token, a cookie, a certificate, a fingerprint, an iris scan, a passcode, etc. Once the user provides the authentication response, the UE 102 transmits the authentication response to the P-CSCF 130 at (7), which then forwards the authentication response to the S-CSCF 134 at (8) (directly or via the I-CSCF 136). The S-CSCF 134 can evaluate the authentication response and, if the response matches or closely matches an expected response, can transmit an indication to the P-CSCF 130 that the native SIM line authentication request succeeded at (9) and thus the native SIM line is or will be registered with the core network 110. However, if the authentication fails (e.g., the response does not match the expected response), then the native SIM line registration also fails.

In response to receiving the indication that the native SIM line authentication request succeeded, the P-CSCF 130 queries the AAG 140 at (10) to determine if the SAT included in the virtual line registration request received from the UE 102 is valid. Here, the AAG 140 validates the SAT and transmits an indication to the P-CSCF 130 that the SAT validation succeeded at (11).

Before, during, or after querying the AAG 140 (and in response to receiving the indication that the native SIM line authentication request succeeded), the P-CSCF 130 queries the IAM 142 at (12) to determine whether the UE 102 and/or the user operating the UE 102 is associated with permissions that allow the UE 102 and/or user to use a virtual line in the core network 110. Here, the IAM 142 determines that the UE 102 and/or user does not have the right permissions and transmits an indication to the P-CSCF 130 that the right permissions are not present and associated with the UE 102 and/or user at (13).

Because the permissions query failed, the P-CSCF 130 may not request registration of the virtual line. Rather, the P-CSCF 130 can generate a single message and transmit the single message to the UE 102 at (14). In response, the UE 102 may display or otherwise indicate that the virtual line is not registered and/or that registration failed. However, the native SIM line and/or emergency call functionality may still be operational on the UE 102 given that the native SIM line has been registered.

Figure 5:
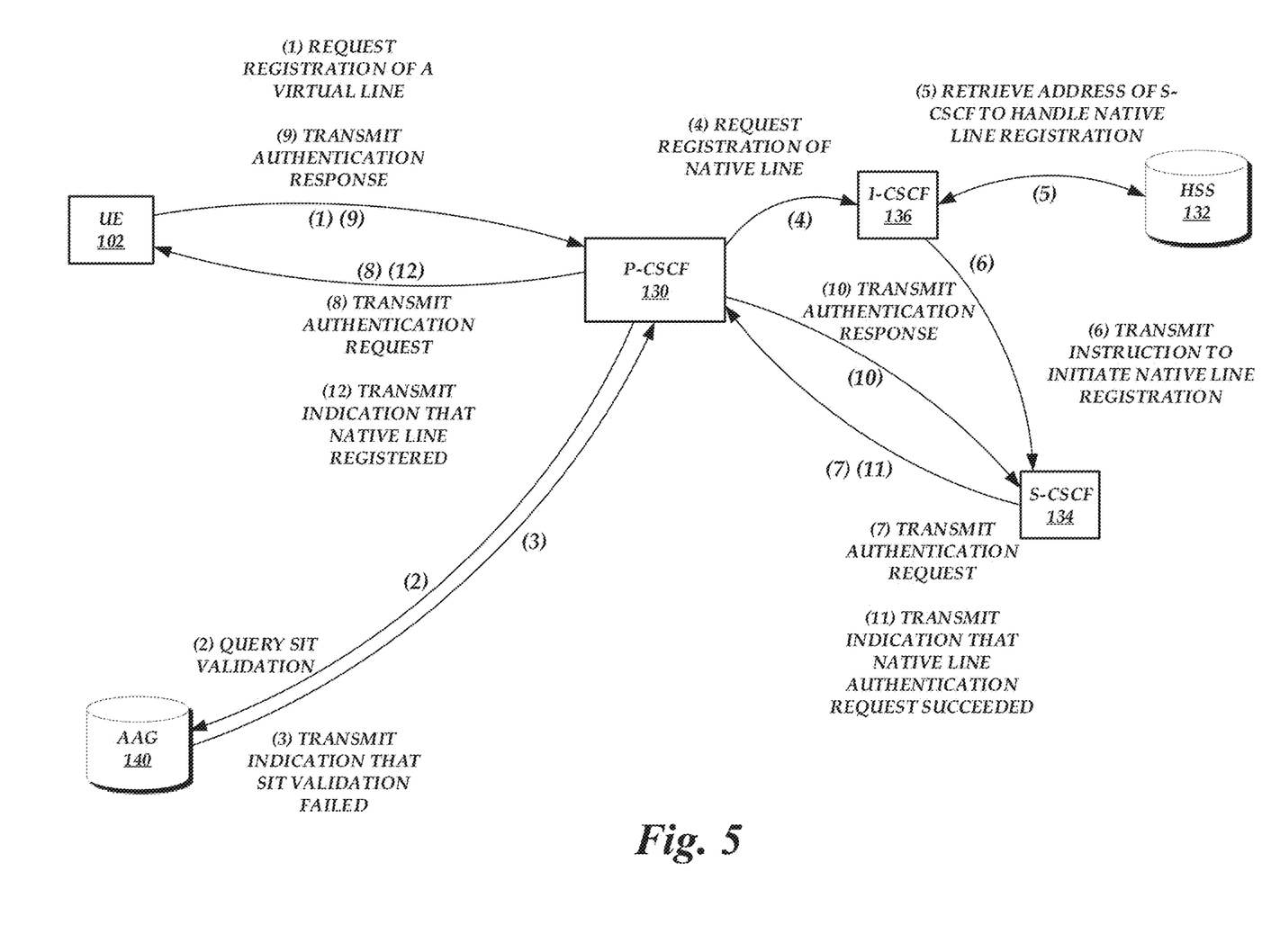
FIG. 5 is another block diagram of the native SIM and virtual line registration environment of FIG. 1 illustrating the operations performed by the components of the native SIM and virtual line registration environment when the Service-Authorization-Token (SAT) validation fails, according to one embodiment.

As described above, in some embodiments the P-CSCF 130 queries the AAG 140 and/or the IAM 142 prior to requesting registration of the native SIM line. FIG. 5 is another block diagram of the native SIM and virtual line registration environment 100 of FIG. 1 illustrating the operations performed by the components of the native SIM and virtual line registration environment 100 when the SAT validation fails, according to one embodiment. As illustrated in FIG. 5, a UE 102 requests the registration of a virtual line at (1) and transmits the request to the P-CSCF 130. The request may be submitted before, during, or after requesting the deregistration of the native SIM line. Alternatively, the P-CSCF 130 will automatically trigger the deregistration of the native SIM line without any request from the UE 102.

The request may include a SAT. However, instead of initially requesting registration of the native SIM line, the P-CSCF 130 can first query the AAG 140 at (2) to determine if the SAT included in the virtual line registration request received from the UE 102 is valid. Here, the AAG 140 cannot validate the SAT and transmits an indication to the P-CSCF 130 that the SAT validation failed at (3).

Nonetheless, even though the SAT validation failed (or, in other embodiments, the permissions query failed), the P-CSCF 130 can still request the registration of the native SIM line at (4) and transmit the request to the I-CSCF 136. The P-CSCF 130 may request the registration of the native SIM line because the native SIM line was deregistered in response to the UE 102 requesting the registration of the virtual line.

The I-CSCF 136 can retrieve an address of an S-CSCF 134 to handle the native SIM line registration from the HSS 132 at (5), and then transmit an instruction to the S-CSCF 134 corresponding to the retrieved address to initiate the native SIM line registration at (6).

In response, the S-CSCF 134 can transmit an authentication request to the P-CSCF 130 at (7), which is then relayed by the P-CSCF 130 to the UE 102 at (8). For example, the authentication request may be a SIP 401 authentication challenge.

Reception of the authentication request may cause the UE 102 to prompt the user to provide an authentication response. Such a response can include a password, a security answer, a one-time passcode, a token, a cookie, a certificate, a fingerprint, an iris scan, a passcode, etc. Once the user provides the authentication response, the UE 102 transmits the authentication response to the P-CSCF 130 at (9), which then forwards the authentication response to the S-CSCF 134 at (10) (directly or via the I-CSCF 136). The S-CSCF 134 can evaluate the authentication response and, if the response matches or closely matches an expected response, can transmit an indication to the P-CSCF 130 that the native SIM line authentication request succeeded at (11) and thus the native SIM line is or will be registered with the core network 110. However, if the authentication fails (e.g., the response does not match the expected response), then the native SIM line registration also fails.

Because the native SIM line authentication request succeeded, the P-CSCF 130 can generate a single message and transmit the single message to the UE 102 at (12). In response, the UE 102 may display or otherwise indicate that the virtual line is not registered and/or that registration failed. However, the native SIM line and/or emergency call functionality may still be operational on the UE 102 given that the native SIM line has been registered.

Example Virtual Line Registration Routine

Figure 6:
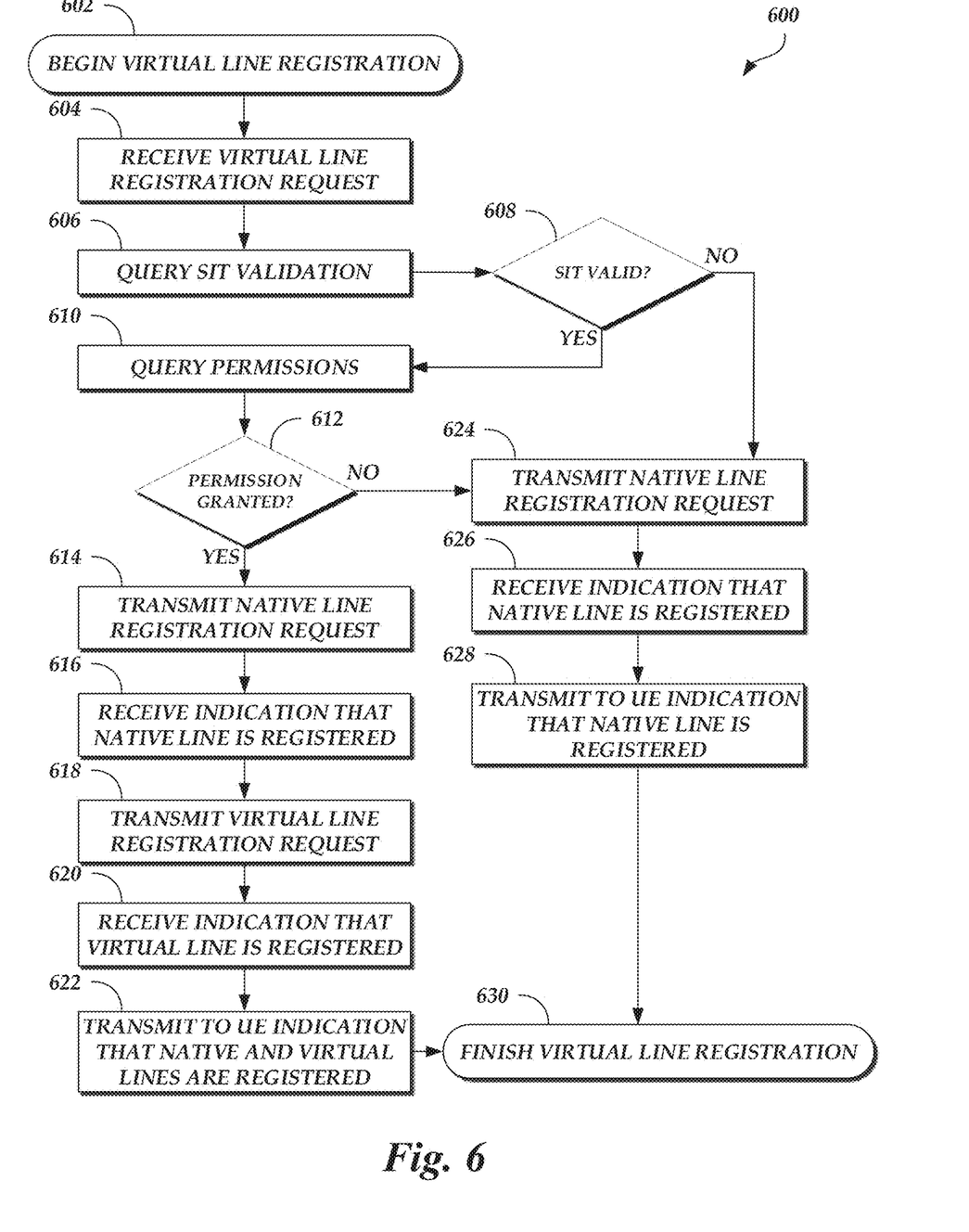
FIG. 6 is a flow diagram depicting a virtual line registration routine illustratively implemented by a P-CSCF, according to one embodiment.

FIG. 6 is a flow diagram depicting a virtual line registration routine 600 illustratively implemented by a P-CSCF, according to one embodiment. As an example, the P-CSCF 130 of FIG. 1 can be configured to execute the virtual line registration routine 600. The virtual line registration routine 600 begins at block 602.

At block 604, a virtual line registration request is received. For example, the virtual line registration request may be received from a UE 102. In an embodiment, the virtual line registration request includes a SAT.

At block 606, validation of the SAT is queried. For example, the AAG 140 may be queried to determine the validity of the SAT.

At block 608, a determination is made as to whether the SAT is valid. For example, the AAG 140 may return a response to the query indicating whether the SAT is valid or invalid. If the SAT is valid, the virtual line registration routine 600 proceeds to block 610. Otherwise, if the SAT is not valid, the virtual line registration routine 600 proceeds to block 624 and the virtual line is not registered.

At block 610, permissions of the UE 102 and/or the user operating the UE 102 to use a virtual line over the core network 110 is queried. For example, the IAM 142 may be queried to determine whether the UE 102 and/or user has the right permissions.

At block 612, a determination is made as to whether permissions are granted to allow the UE 102 and/or user to use a virtual line over the core network 110. For example, the IAM 142 may return a response to the query indicating whether the right permissions are present. If permissions are granted to allow the UE 102 and/or user to use a virtual line over the core network 110, the virtual line registration routine 600 proceeds to block 614. Otherwise, if permissions are not granted to allow the UE 102 and/or user to use a virtual line over the core network 110, the virtual line registration routine 600 proceeds to block 624 and the virtual line is not registered.

At block 614, a native SIM line registration request is transmitted to, for example, an I-CSCF. The request causes the I-CSCF to instruct an S-CSCF to initiate a native SIM line registration.

At block 616, an indication is received that the native SIM line is registered. For example, the indication may be received from the S-CSCF that initiated the native SIM line registration.

At block 618, a virtual line registration request is transmitted to, for example, an I-CSCF. The request causes the I-CSCF to instruct an S-CSCF to initiate a virtual line registration.

At block 620, an indication is received that the virtual line is registered. For example, the indication may be received from the S-CSCF that initiated the virtual line registration.

At block 622, a message is transmitted to the UE indicating that the native SIM and virtual lines are registered. For example, a single message may include both indications. After transmitting the indication that the native SIM and virtual lines are registered, the virtual line registration routine 600 ends, as shown at block 630.

At block 624, a native SIM line registration request is transmitted to, for example, an I-CSCF. The request causes the I-CSCF to instruct an S-CSCF to initiate a native SIM line registration.

At block 626, an indication is received that the native SIM line is registered. For example, the indication may be received from the S-CSCF that initiated the native SIM line registration.

At block 628, a message is transmitted to the UE indicating that the native SIM line is registered. The virtual line may not be registered, however, and the UE may indicate accordingly. After transmitting the indication that the native SIM line is registered, the virtual line registration routine 600 ends, as shown at block 630.

Alternatively, the virtual line registration routine 600 may perform block 622 prior to performing blocks 614, 616, 618, and/or 620. In addition, in alternative embodiments, the virtual line registration routine 600 may perform blocks 606, 608, 610, and/or 612 after performing (1) blocks 614 and/or 616 and/or (2) blocks 624 and/or 626.

Terminology

All of the methods and tasks described herein may be performed and fully automated by a computer system. The computer system may, in some cases, include multiple distinct computers or computing devices (e.g., physical servers, workstations, storage arrays, cloud computing resources, etc.) that communicate and interoperate over a network to perform the described functions. Each such computing device typically includes a processor (or multiple processors) that executes program instructions or modules stored in a memory or other non-transitory computer-readable storage medium or device (e.g., solid state storage devices, disk drives, etc.). The various functions disclosed herein may be embodied in such program instructions, or may be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips or magnetic disks, into a different state. In some embodiments, the computer system may be a cloud-based computing system whose processing resources are shared by multiple distinct business entities or other users.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware (e.g., ASICs or FPGA devices), computer software that runs on computer hardware, or combinations of both. Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the rendering techniques described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements or steps. Thus, such conditional language is not generally intended to imply that features, elements or steps are in any way required for one or more embodiments or that one or more embodiments necessarily include logic for deciding, with or without other input or prompting, whether these features, elements or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, or Z). Thus, such disjunctive language is not generally intended to, and should not, imply that certain embodiments require at least one of X, at least one of Y, and at least one of Z to each be present.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A computer implemented method comprising:
   receiving, from a user equipment (UE), a request to register a first line with a cellular network, wherein the first line comprises a virtual line;
   determining that at least portion of content of the request is valid;
   prior to initiating a registration of the first line for use by the UE, initiating a deregistration and a registration of a second line associated with the UE, wherein the second line comprises a native line and the UE is capable of communicating using multiple types of lines including at least the virtual line and the native line;
   determining that the UE is not authorized to register the first line;
   receiving an indication that the registration of the second line is successful; and
   instructing the UE to indicate that the first line is not registered; and
   receiving an indication that the UE is communicating over the cellular network using the second line subsequent to successful registration of the second line and in response to the first line not being registered.

2. The computer implemented method of claim 1, wherein determining that the UE is not authorized to register the first line further comprises:
   receiving a response indicating that the portion of the content is valid;
   submitting a query using an identifier associated with the UE; and
   receiving a second response indicating that the UE is not associated with permissions that allow the UE to register the first line.

3. The computer implemented method of claim 1, wherein determining that the UE is not authorized to register the first line further comprises receiving a response indicating that the portion of the content is invalid.

4. The computer implemented method of claim 1, further comprising:
   receiving, from the UE, a second request to register a third line with the cellular network;
   initiating a second deregistration of the second line associated with the UE;
   determining that the UE is authorized to register the third line;
   initiating a second registration of the second line associated with the UE;
   receiving an indication that the second registration of the second line is successful; and
   initiating a registration of the third line.

5. The computer implemented method of claim 4, further comprising causing the UE to indicate that the second and third lines are registered.

6. The computer implemented method of claim 4, wherein the second request to register the third line comprises a token.

7. The computer implemented method of claim 6, wherein determining that the UE is authorized to register the third line further comprises:
   submitting a query using the token;
   receiving a response indicating that the token is valid;
   submitting a second query an identifier associated with the UE; and receiving a second response indicating that the UE is associated with permissions that allow the UE to register the third line.

8. The computer implemented method of claim 7, wherein the response comprises a first session initiation protocol (SIP) 2000K message, and wherein the second response comprises a second SIP 2000K message.

9. The computer implemented method of claim 8, further comprising transmitting a third 2000K message to the UE.

10. Non transitory, computer-readable storage media comprising computer-executable instructions, wherein the computer-executable instructions, when executed by a computer system, cause the computer system to:
receive, from a user equipment (UE), a request to register a first line with a cellular network, wherein the first line comprises a virtual line;
determine that at least a portion of content of the request is valid;
prior to initiating a registration of the first line for use by the UE, initiate a deregistration and a registration of a second line associated with the UE, wherein the second line comprises a native line and the UE is capable of communicating using multiple types of lines including at least the virtual line and the native line;
determine that the UE is not authorized to register the first line;
receive an indication that the registration of the second line is successful; and
instruct the UE to indicate that the first line is not registered; and
receive an indication that the UE communicate over the cellular network using the second line subsequent to successful registration of the second line and in response to the first line not being registered.

11. The non transitory, computer-readable storage media of claim 10, wherein the computer-executable instructions further cause the computer system to:
receive a response indicating that the portion of the content is valid; submit a query using an identifier associated with the UE; and
receive a second response indicating that the UE is not associated with permissions that allow the UE to register the first line.

12. The non transitory, computer-readable storage media of claim 10, wherein the computer-executable instructions further cause the computer system to receive a response indicating that the portion of the content is invalid.

13. The non transitory, computer-readable storage media of claim 10, wherein the computer-executable instructions further cause the computer system to:
receive, from the UE, a second request to register a third line with the cellular network;
initiate a second deregistration of the second line associated with the UE;
determine that the UE is authorized to register the third line;
initiate a second registration of the second line associated with the UE;
receive an indication that the second registration of the second line is successful; and
initiate a registration of the third line.

14. The non transitory, computer-readable storage media of claim 13, wherein the computer-executable instructions further cause the computer system to cause the UE to indicate that the second and third lines are registered.

15. The non transitory, computer-readable storage media of claim 13, wherein the second request to register the third line comprises a token.

16. The non transitory, computer-readable storage media of claim 15, wherein the computer-executable instructions further cause the computer system to:
submit a query using the token;
receive a response indicating that the token is valid;
submit a second query an identifier associated with the UE; and
receive a second response indicating that the UE is associated with permissions that allow the UE to register the third line.

17. A core network comprising:
a first core network component; and
a second core network component comprising a processor in communication with the first core network component and configured with specific computer-executable instructions to:
receive, from a user equipment (UE), a request to register a first line with the core network, wherein the first line comprises a virtual line;
determine that at least a portion of content of the request is valid;
prior to initiating a registration of the first line for use by the UE, initiate a deregistration and a registration of a second line associated with the UE, wherein the second line comprises a native line and the UE is capable of communicating using multiple types of lines including at least the virtual line and the native line;
determine that the UE is not authorized to register the first line;
receive an indication that the registration of the second line is successful; and
instruct the UE to indicate that the first line is not registered; and
receive an indication that the UE communicate over the core network using the second line subsequent successful registration of the second line and in response to the first line not being registered.

18. The core network of claim 17, wherein the second core network component is further configured with specific computer-executable instructions to:
receive a response indicating that the portion of the content is valid;
submit a query using an identifier associated with the UE; and
receive a second response indicating that the UE is not associated with permissions that allow the UE to register the first line.

19. The core network of claim 17, wherein the second core network component is further configured with specific computer-executable instructions to receive a response indicating that the portion of the content is invalid.

20. The core network of claim 17, wherein the second core network component is further configured with specific computer-executable instructions to:
receive, from the UE, a second request to register a third line with the core network;
initiate a second deregistration of the second line associated with the UE;
determine that the UE is authorized to register the third line;
initiate a second registration of the second line associated with the UE;

receive an indication that the second registration of the second line is successful; and
initiate a registration of the third line.

\* \* \* \* \*